Oct. 7, 1969   C. KOCH   3,471,704
LIGHT-MEASURING APPARATUS FOR CAMERAS
Filed June 8, 1967   2 Sheets-Sheet 1
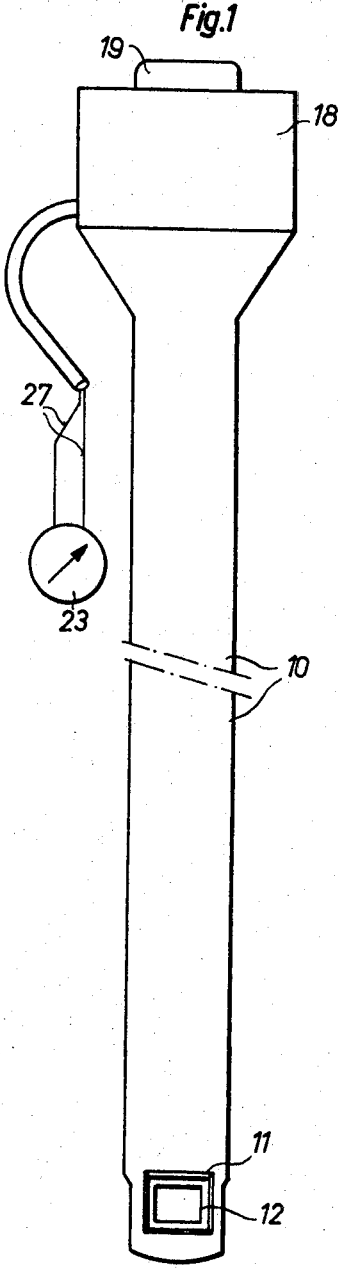
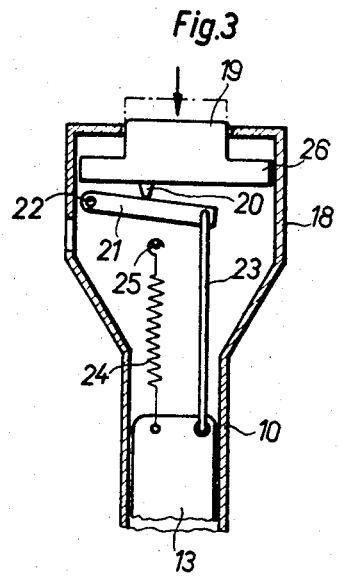
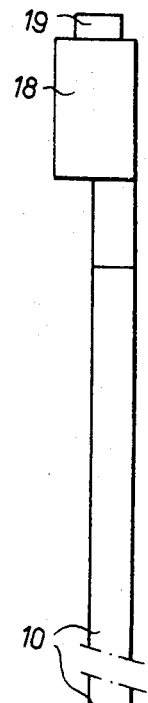
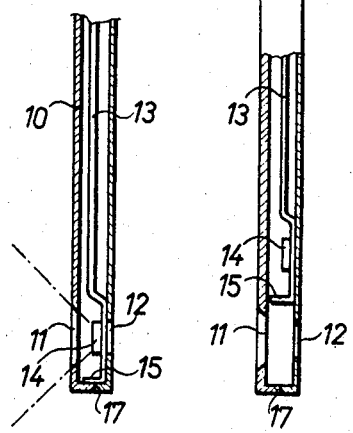
INVENTOR.
Carl Koch
BY Watson Cole, Grindle & Watson
Attys.

Oct. 7, 1969          C. KOCH          3,471,704
LIGHT-MEASURING APPARATUS FOR CAMERAS
Filed June 8, 1967                    2 Sheets-Sheet 2
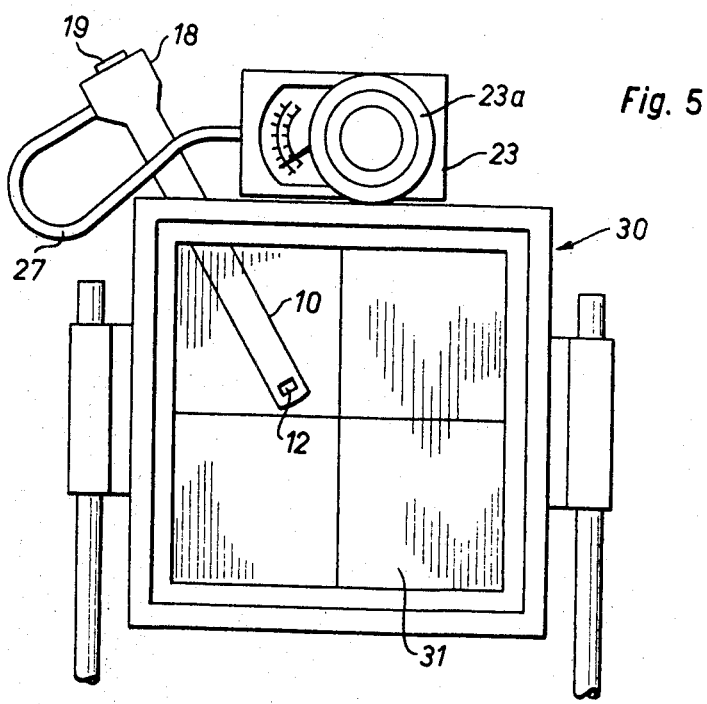
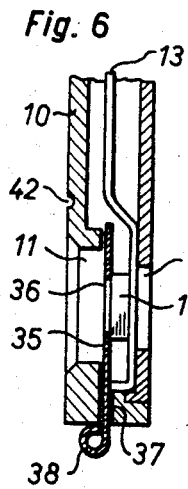
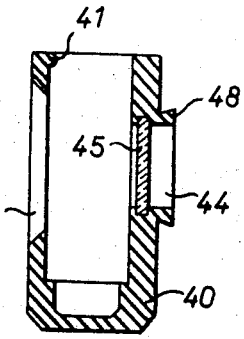
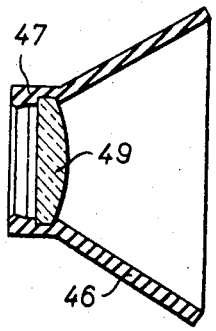
INVENTOR.
Carl Koch
BY
Watson, Cole, Grindle & Watson
Attys.

United States Patent Office 3,471,704
Patented Oct. 7, 1969

3,471,704
LIGHT-MEASURING APPARATUS FOR CAMERAS
Carl Koch, Schaffausen, Switzerland, assignor to Sinar AG Schaffhausen, Feuerthalen, Switzerland
Filed June 8, 1967, Ser. No. 644,726
Claims priority, application Switzerland, June 9, 1966, 8,588/66
Int. Cl. G01j 1/04
U.S. Cl. 250—239                                    10 Claims

ABSTRACT OF THE DISCLOSURE

A photosensor is mounted on a slide within an elongated housing in which the slide is normally spring-biased to maintain the photosensor out of range of two windows at opposite sides of the housing, the slide being limited in downward motion against the spring to position the photosensor to receive light through the windows.

---

The present invention relates to an apparatus for selective light measuring in the plane of a photographic medium and large format cameras.

A structure for this purpose is mounted in a rod-like casing having an end part at the front side provided with a window opening and having in back thereof a photoelectric cell, whereas at the other end of the casing or housing a hand grip is provided in order to set and guide the cell which is many times smaller than the picture format and adjustable to different pictures to be photographed. In the use of the apparatus, the end of the rod-like housing is brought directly in front of or behind a mat plate of the camera, in order that by means of an attached electric measuring instrument on a photo-electric cell, the light requirements of the different parts of the picture may be individually considered, that is selectively.

A certain drawback of known devices resides therein that the part of a rod-like housing containing the photoelectric cell covers the picture part on the mat plate in connection with which the light is to be measured. Thus it is at times difficult to place the photo-electric cell accurately on a definite picture part which leads to uncertainties in light measuring or actually set up wrong results. For an exact operation, it is often times desired to picture the exact part to be measured and to exactly adjust the photo-electric cell. The present invention solves all the former problems.

It is an object of the present invention to provide a structure in which the back side of housing is provided with a rear window opening at least close to and in register with the front window opening and that the photoelectric cell is mounted on a slide. The latter is slidably mounted in the housing and is movable by an operating member so that the photo-electric cell can be, at will, adjusted to an operative position between the front and rear window openings or in a position out of the influence of both windows in the housing.

By means of the formation of the device, the picture to be photographed can be seen through the back and front window openings on a mat plate and can be selected as long as the photo-electric cell is moved out of range of the window openings. At the same time the cell is adjusted in its inoperative position within the rod-like housing and is thus protected against mechanical faults as well as against intensive light. Only during the time when characteristics and measurements are to be observed, is it necessary to move and adjust the slide so that the photo-electric cell is in its operative position between the front and rear window openings.

Further objects will be apparent from the following description when considered in connection with the accompanying drawings in which:

FIGURE 1 is a front elevation of a first modification of the light measuring device according to the invention;

FIG. 2 is a side view partly in section of the device of FIG. 1,

FIG. 3 is a part longitudinal section of the top or hand grip part of the device of FIG. 1 with the operating part in depressed position, FIG. 4 is a part longitudinal section of the lower part of the device showing the slide with its photo-electric cell or transformer, FIG. 5 is a rear elevation of a mat plate camera having the device of FIGS. 1 to 4 applied thereon, FIG. 6 is a sectional view of a modified structure of the bottom end portion of FIG. 4, FIG. 7 is a sectional view of the bottom end of the device showing a small mat disc in a cap, and FIG. 8 is a sectional view of an attachment to the structure of FIG. 6 to observe a small mat disc.

The form of invention of FIGS. 1 to 4 shows a housing or casing 10 which has the form of essentially an elongated rod. One end part of the housing 10 is provided on the front casing side with a front window opening 11 and a smaller rear window opening 12 on the back side of the casing. FIG. 1 shows that two window openings 11 and 12 as co-axial and are rectangular in form.

In the inside of the casing 10 there is provided a flat slide 13, FIGS. 2 to 4, which carries a photo-electric cell or transformer 14, for example, a photo-resistance or a photo-diode. The cell 14 has a light sensitive surface, which corresponds as to form and size to the back window opening 12 at the back side of the casing 10, but faces the front side of the casing. On its lower end, FIGS. 2 and 4, the slide 13 has a right angled bent projection or lobe 15, which, dependent on the position of the slide 13, either strikes the lower end wall or bottom 17 of the housing 10, FIG. 4, or periodically completely closes the light cross sectional surface of the casing 10 above the two window openings 11 and 12, FIG. 2. The slide 13, together with a detector or photo-electric cell 14, is slidable in the housing 10, as will be more fully described.

The upper end of the rod-like housing 10, as shown on the drawings, has a handle or grip 18 which serves to manually manipulate the entire device. In the inside of the hand grip 18 there is provided an operating member 19 in the form of a press member or actuator and which projects partly outwardly through an opening in the casing. The operating member 19 is movable longitudinally in the rod-like casing 10 and is provided on the bottom surface with a nose or projecting knob 20 which, according to FIG. 3 contacts and actuates a single armed lever 21 pivotally mounted in the inner space of the hand grip 18 to rotate on a pivot or pin 22. The lever 21 is in operative relationship with the slide 13 by means of a link or rod 23. A spring 24 is connected at one end to a stationary bolt 25 inside the hand grip 18 and at the other end it is connected to the slide 13. Th spring 24 has the purpose to force the slide 13 upwardly as shown on the drawing, FIG. 3, and thereby the rod 23 and the lever 21 of the operating member 19 are likewise urged and moved upwardly until the projecting lugs 26 on the member 19 abut against the upper end wall of the housing 10.

The photo-electric cell 14 is connected by a line or wires 27, FIG. 1, to an electrical measuring instrument 23 which is provided outside of the housing 10 and preferably on the casing 10 itself.

If one does not press on the operating button or member 19, the spring 24 will hold the slide in its upper moved position of rest, as shown in FIG. 2. The photoelectric cell 14 will thus be located in its inoperative position out of the influence of the window openings 11 and 12, and actually in the inside of the housing 10. Thereby the bent flap 15 of the slide 13 will practically prevent any light from the openings 11 and 12 from reaching the cell 14. The latter is thus protected mechanically as also against the entry of detrimental light rays.

If one, however, presses the operating button or member 19 into the hand grip according to FIG. 3, the nose or projection 20 on the underside of the member 19 will cause the lever 21 to swing downwardly, whereby the slide 13 will also be moved downwardly by the rod 23 under the influence of the spring 24. The single armed lever 21 has a greater path of movement for the slide 13 relative to the movement of the operating member 19 of approximately two-fold. The slide 13 will be moved downwardly so far until the flap 15 contacts on the bottom end 17 of the housing 10. Thus the photo-electric cell 14 will be in its operative position between the front window opening 11 and the back window opening 12, as shown in FIG. 4. The front window 11 is so large that also light rays will be projected on the cell 14 under an angle of 45° from all sides.

In connection with the use of the described light measuring device, the rod-like housing 10, with its window openings 11 and 12, is inserted or brought adjacent the end part in the picture plane of a central or large format camera 30, for example directly in front of the mat plate 31, on which the picture to be photographed is discernible. The front window opening 11 will in every case face the objective of the camera and the back window opening will face the observer. As long as the operating member 19 is not pressed, the slide 13 with the photo-electric cell 14 will be in its upper moved or inoperative position as in FIGS. 1 and 2. The light rays can thus pass unhindered through both window openings 11 and 12. One can thus observe, on the observation side, through the back window opening 12, the picture on the mat plate 31. If one wishes to determine the light timing for a desired picture subject, one sets the light measuring element or device in such a position that the desired picture subject may be observed in the window opening 12. Then one pushes the operating member 19 down to bring thereby the photo-electric cell 14 in its operating position behind the front window opening 11, by suitable sliding of the slide 13. The device 14 will take thereby exactly the position of the smaller window opening 12 and thus the desired picture part will be taken in. By means of an instrument 23' and the scale 23a and pointer, it will be possible to read the exact and correct light treatment for the picture to be taken and for a definite photographic material to be used. After the instrument 23' has been observed, the operating element 19 is released whereby the movable parts of the light measuring device will return to their original positions of rest under the influence of the return or tension spring 24.

The essential advantage of the described light measuring appliance according to the invention resides therein that the picture part to be measured can be exactly observed on the mat plate 31 by means of the rear window opening 12 and thereafter the photo-electric cell 14 can be brought into the selected position. A further advantage resides in the protected position and mounting of the photo-electric cell 14 in the non-operative position and non-use of the device.

In a modified structure, not illustrated, the hand grip 18 or a part formed on the rod-like casing 10 may comprise a swing bearing, in order that the light measuring device may be adjusted in the plane of the mat plate or may be swung out therefrom, as for example a finder member of a double eye mirror-reflecting camera.

FIG. 6 shows a second modification of the invention as to the light measuring device which differentiates from the described form of the invention thereby that the front window opening 11, as also the rear window opening 12, is larger than the light sensitive surface of the photoelectric cell 14 and that a mask or shield 35 is provided with a small masking opening 36 in the housing 10. The mask 35 may be inserted and removed through a slot 37 in the lower end of the housing 10 and is provided on the outer side outside the housing with a hand grip 38 so that the mask 35 may be grasped for insertion and removal out of the casing 10. The position of the mask 35 is such that it will be directly in front of the light-sensitive surface of the photo-electric cell 14, when the latter is brought in its operative position between the two window openings 11 and 12, as shown in FIG. 6.

As long as the photo-electric cell 14 is pulled into its inoperative position inside the housing 10, as in FIG. 2, one can see through the cut-out portion 36 in the mask 35 by the back window 12, and the limited picture which may be observed on the mat plate of the camera is discernible on the mask 35 to agree exactly with the picture part which falls on the photo-electric cell 14 when this is brought into the operative position. Thus the measuring field will agree with the picture part to be sighted which will increase the measuring accuracy.

By interchanging the mask 35 with another having a smaller masking cut-out 36, the measuring field will be made smaller, whereby, at the same time, the limiting of the picture part to be observed on the mat plate will be automatically made smaller in the same degree. At the measuring instrument 23' there is provided a scale for each different masking opening 36.

FIG. 7 shows a cap 40 which one may slide over the lower end, FIG. 6, of the light-measuring device. The cap 40 consists of a polymeric artificial material and has at least in part spring-like walls. On at least one wall there are provided projecting ridges or knobs 41 which are for the purpose of cooperating with a channel or depression 42 to spring therein, when the cap 40 is pushed on to the end of the housing 10 in position of use. The cap 40 has two openings 43 and 44 in agreement with the window openings 11 and 12 in the housing 10. In one opening 44, there is provided a small mat disc or plate 45, which in the position of use of the cap 40 is directly behind the window opening 12 of the housing 10.

The described cap 40 is used together with the small mat plate 45 when the light-measuring device on a camera is to be used without a mat disc. In this case, the small mat disc 45 will permit the observation and adjustment of the selected picture part of which the light brightness is to be measured. For this purpose the cap 40 will be pulled over the lower end of the housing 10, until the ridge or knob 41 falls into the groove or depression 42. Thereafter the manipulation of the device is the same as described as to FIGS. 1 to 5.

In a non-illustrated modification, the small disc 45 may be provided with a known Fresnel-lens to increase the brightness of the picture on the mat disc.

FIG. 8 shows an observation tube 46, having a ring-formed end part 47 to be snapped into or on a ring-formed rib 48 on the outer side of the cap 40. The ring-shaped rib 48 runs around the back opening 44 which also has a small mat disc 45 therein. In the tube 46 there is a collective lens 49 through which the picture on the mat plate 45 can be observed when the tube 46 is secured on the cap 40. Upon non-use of the lens 49, the tube 46 may simply be removed from the cap 40.

Obviously also means can be provided to permit the application by choice of small mat discs directly behind the back window opening 12 of the housing 10. Likewise measures can be taken in order to make it possible to removably apply the tube 46 or only one lens directly behind the window opening 12.

I claim:

1. Apparatus for the selective light measuring in the plane of a photographic medium comprising an elongated housing in the form of a hollow rod having a pair of window openings which are co-axial relative to each other and provided at one end of the housing, a slide plate slidably supported in the housing, an operating member in the other end of the housing, means connected to the slide and the operating member which when actuated will adjust the slide plate within the range of the coaxial windows, a light sensitive cell mounted on the slide plate which normally is out of range of the window openings, and means to force the slide in the housing so that the cell is out of range of the windows when the operating member is not actuated manually and the cell within the housing is out of range of the windows.

2. Apparatus according to claim 1, in which the end of the slide near the cell is provided with a right angle flap acting to prevent light entering the windows from reaching the cell in the position of the cell when out of range of the windows.

3. Apparatus according to claim 1, in which the light sensitive cell is a photo-electric cell.

4. Apparatus according to claim 1, in which the means includes a tension spring connected at one end to the housing and the other end to the slide, the operating member in the form of a push button acting against the force of the spring when the slide is actuated to adjust the cell in the range of the windows.

5. Apparatus according to claim 1, in which the one of the pair of windows is a front window opening of a size larger than the cell and the other window opening is a rear window opening of approximately the same size as the cell.

6. Apparatus according to claim 1, in which the one of the pair of windows is a front window opening of a size larger than the cell and the other window opening is a rear window opening of approximately the same size as the cell, the light rays entering the front window opening on to the cell forming a light range of approximately 45°.

7. Apparatus according to claim 1, in which the light sensitive cell is a photo-electric cell, and in which a mask is provided between the cell and one of the window openings.

8. Apparatus according to claim 1, in which the light sensitive cell is a photo-electric cell, and in which a mask is provided between the cell and one of the window openings, and which is removable with a sliding fit into the housing.

9. Apparatus according to claim 1, in which one of the pair of windows is a front window opening of a size larger than the cell and the other window opening is a rear window opening of approximately the same size as the cell, and in which the rear window opening is provided with a mat plate.

10. Apparatus according to claim 1, in which one of the pair of windows is a front window opening of a size larger than the cell and the other window opening is a rear window opening of approximately the same size as the cell, and in which the rear window opening is provided with a light collecting lens.

References Cited

UNITED STATES PATENTS 2,959,092½   11/1960   Faulhaber.

FOREIGN PATENTS 552,398   4/1943   Great Britain.

ROBERT SEGAL, Primary Examiner

U.S. Cl. X.R.

95—10; 356—219